United States Patent
Ogawa

(10) Patent No.: US 7,603,231 B2
(45) Date of Patent: Oct. 13, 2009

(54) NAVIGATION METHOD AND SYSTEM HAVING IMPROVED ARRIVAL DETECTION FUNCTION FOR LARGE SCALE DESTINATION

(75) Inventor: Tommy Ogawa, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 456 days.

(21) Appl. No.: 11/271,029

(22) Filed: Nov. 12, 2005

(65) Prior Publication Data
US 2007/0112510 A1     May 17, 2007

(51) Int. Cl.
G01C 21/30     (2006.01)
G01C 21/00     (2006.01)

(52) U.S. Cl. .................. 701/209; 701/200

(58) Field of Classification Search ............ 701/201, 701/203, 209
See application file for complete search history.

(56) References Cited

U.S. PATENT DOCUMENTS 6,006,161 A * 12/1999 Katou .................. 701/212
6,542,814 B2 * 4/2003 Polidi et al. ............ 701/208
6,622,085 B1 * 9/2003 Amita et al. ............ 701/208
2003/0028319 A1 * 2/2003 Khavakh et al. ........ 701/209
2004/0193369 A1 * 9/2004 Kokojima et al. ...... 701/209
2004/0212627 A1 * 10/2004 Sumizawa et al. ...... 345/619

FOREIGN PATENT DOCUMENTS

JP     07-055488     3/1995
JP     07-063568     3/1995

* cited by examiner

*Primary Examiner*—Mark Hellner
*Assistant Examiner*—Helal A Algahaim
(74) *Attorney, Agent, or Firm*—Muramatsu & Associates

(57) ABSTRACT

A navigation system guides a user to a destination with an improved arrival detection capability when the selected destination is a large facility or a natural place that occupies a relatively large area. When a particular destination is specified by the user, the navigation system calculates a route to the destination based on the address of the specified destination. The navigation system also checks whether the specified destination is associated with polygon data. When the specified destination is associated with the polygon data, the navigation system creates an arrival detection start range. After reaching the arrival detection start range, the navigation system detects the arrival at the destination when any part of the polygon of the destination comes within an arrival detection range of the navigation system.

18 Claims, 9 Drawing Sheets

Fig. 1A

On: San Diego Freeway

Fig. 1B

| Dest | Find Destination by |
|---|---|
| | Address |
| | Intersection |
| | Point of Interest |
| | Map Cursor |
| | Recent Route |
| | Address Book |
| | Today's Plan |

Fig. 1C

| Dest | Find Point of Interest by |
|---|---|
| | Place Name |
| | Place Type |

Fig. 1D

| Dest | Select Category |
|---|---|
| | ATM |
| | BANK |
| | GAS STATION |
| | HOSPITAL |
| | MOVIE THEATER |
| | RESTAURANT |
| | VETERINARIAN |

Fig. 1E

| Dest | Select Name |
|---|---|
| Genkai 15435 Jeffrey Rd. Irvine, CA (949) 786-3420 | |
| | Pizza Hut |
| | Genkai |
| | Hard Rock Cafe |
| | Sushi Boy |

Fig. 1F

| Confirm Route |
|---|
| Genkai 15435 Jeffrey Rd. Irvine, CA (949) 786-3420 |
| By Quickest Route Method |
| OK to Proceed |
| Options |

Fig. 1G

Calculating

Fig. 1H

Next Turn: 1.8 mi
Jeffery Rd.

To    6 mi    0:11 to go
On: Alton St., Irvine

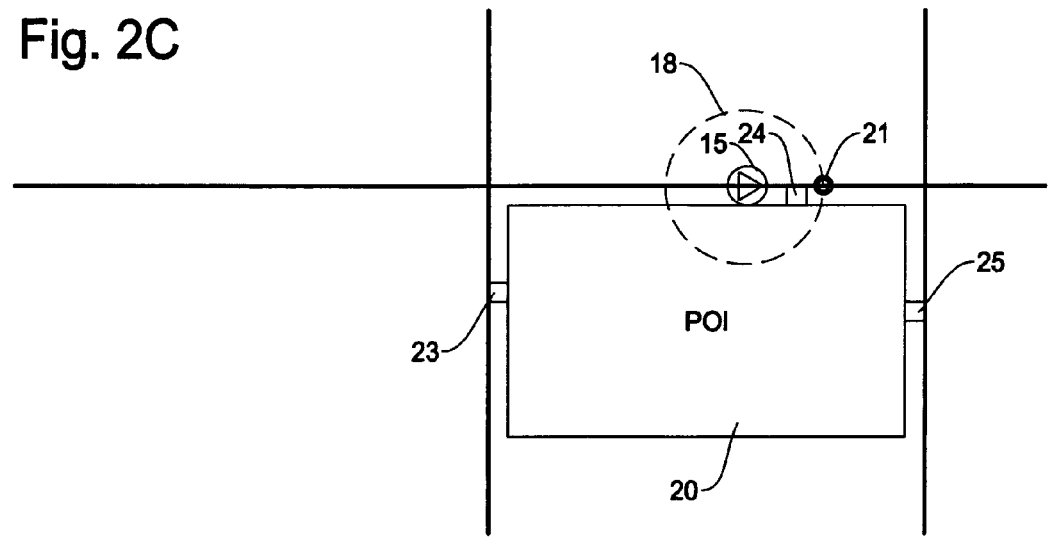
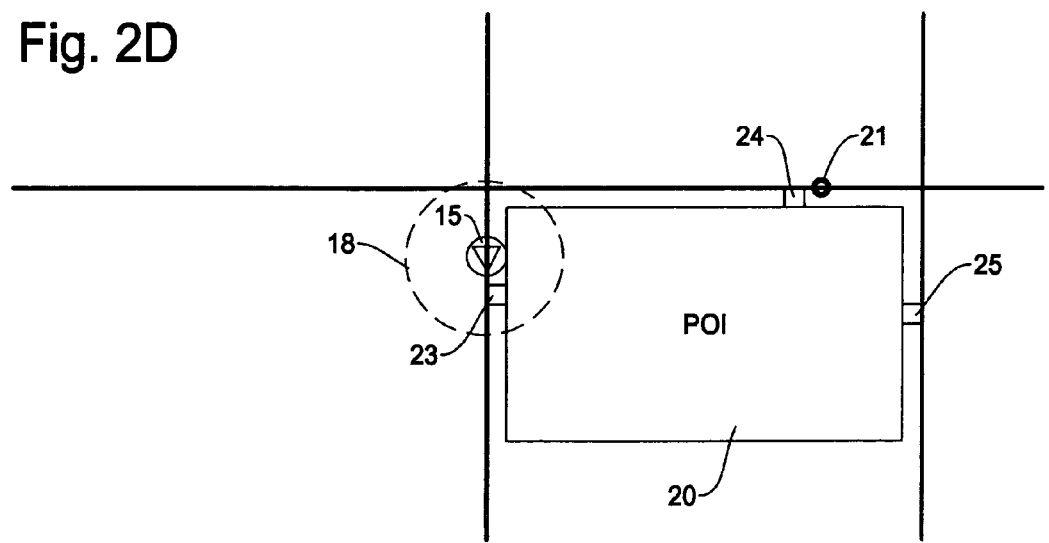

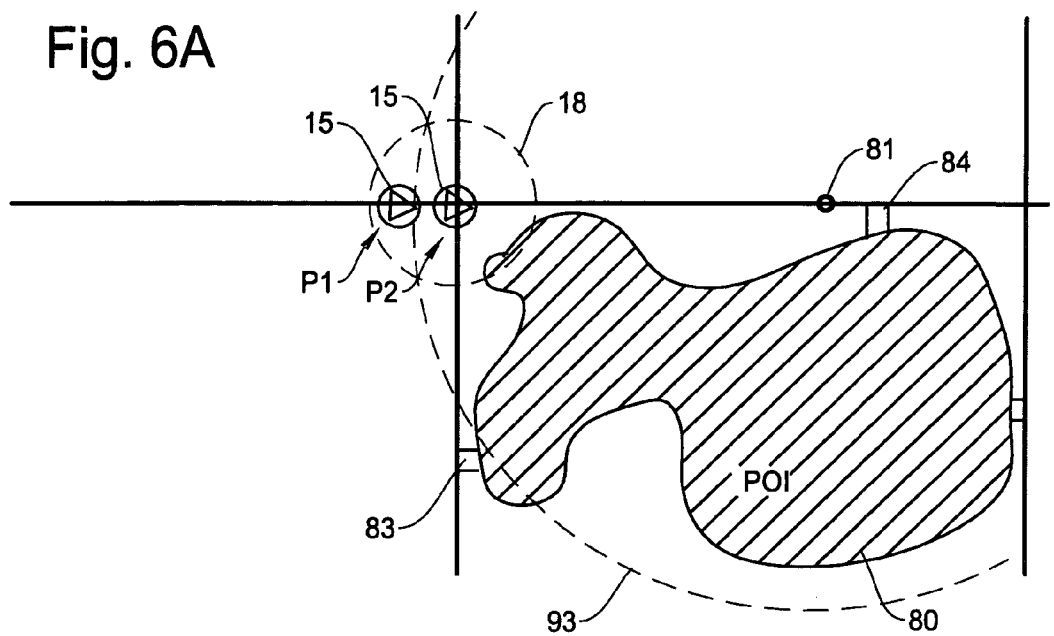
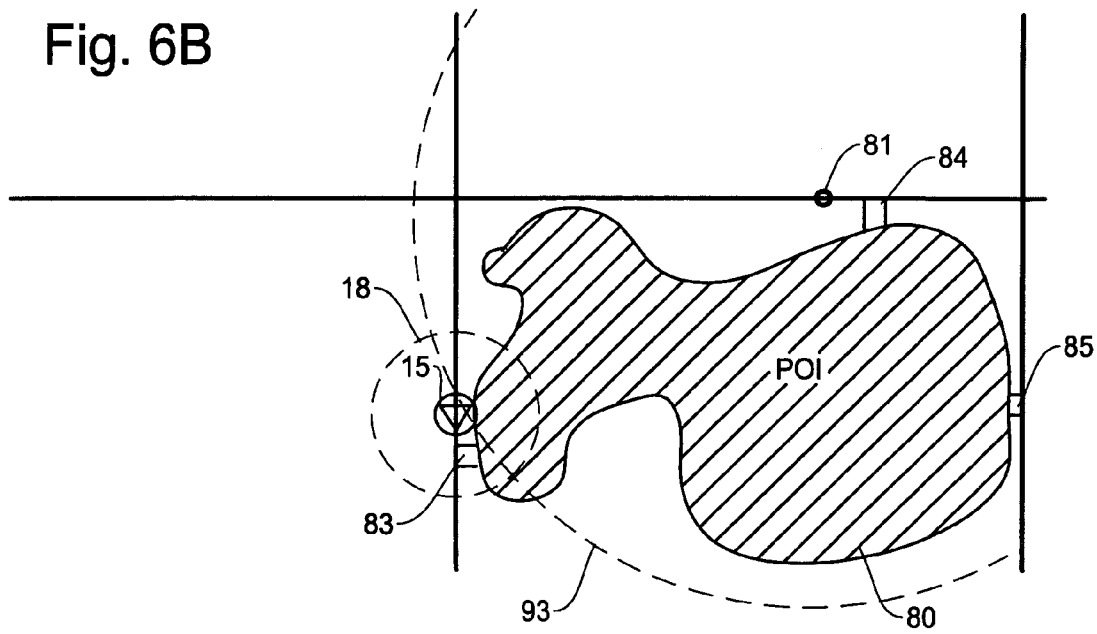

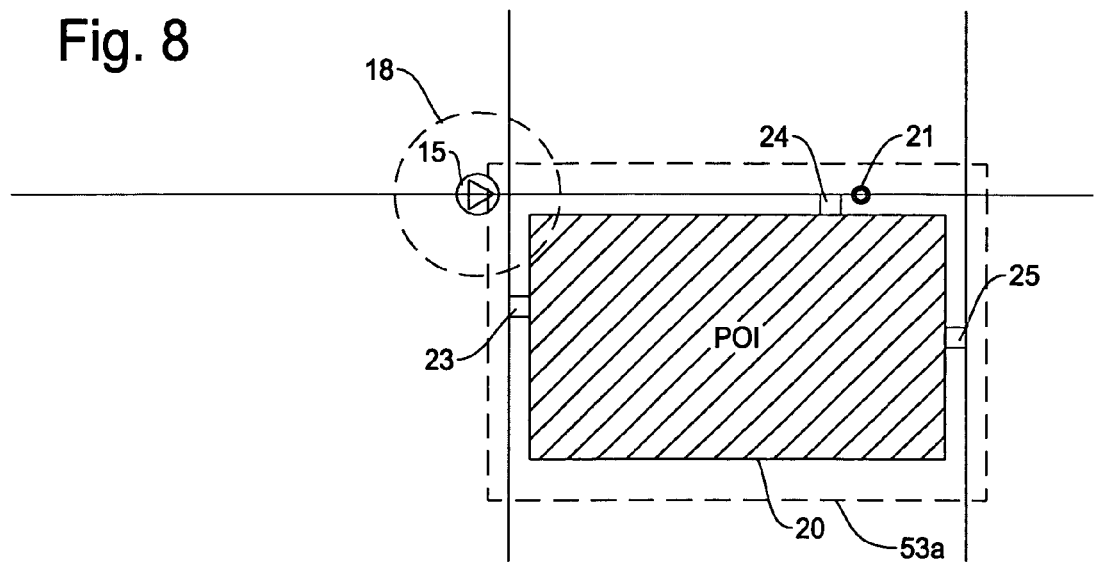
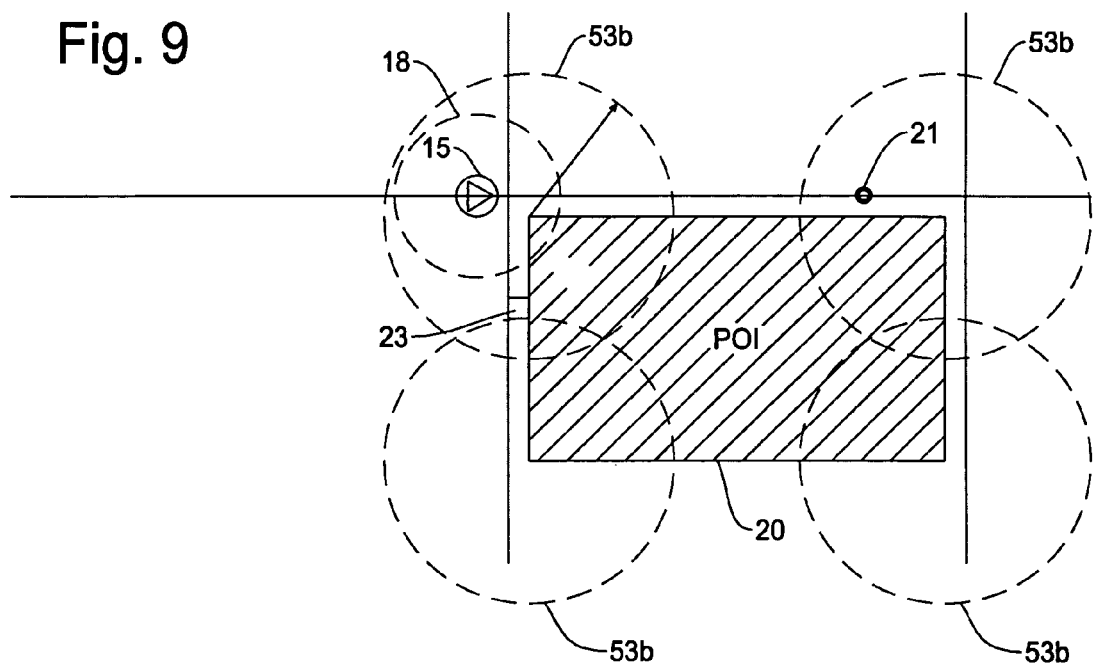

NAVIGATION METHOD AND SYSTEM HAVING IMPROVED ARRIVAL DETECTION FUNCTION FOR LARGE SCALE DESTINATION

FIELD OF THE INVENTION

This invention relates to a navigation method and system for guiding a user to a destination, and more particularly, to a navigation method and system for guiding a user to a point of interest ("POI") selected as a destination with an improved arrival detection capability when the selected POI is a large facility or a natural place that occupies a relatively large area.

BACKGROUND OF THE INVENTION

A navigation system performs travel guidance for enabling a user to easily and quickly reach the selected destination. A typical example is a vehicle navigation system where a vehicle equips with a navigation function to guide a driver to a destination. Such a navigation system detects the position of the user or user's vehicle, reads out map data pertaining to an area at the current vehicle position from a data storage medium. Alternatively, such map data can be provided to the user from a remote server through a communication network such as Internet.

When a destination is set, the navigation system starts a route guidance function for guiding a user along a calculated route from the start point to the destination. During the route guidance, the navigation system reads the nodes data from the data storage medium such as DVD and successively stores the nodes data of road segments constituting the guided route in a memory. In the actual traveling, the node series stored in the memory is searched for a portion of the guided route to be displayed in a map display area of the monitor screen, and the portion of the guided route is highlighted so as to be clearly discernible from other routes. When the vehicle is within a predetermined distance from an intersection it is approaching, a highlighted intersection diagram with an arrow indicating the direction to turn at the intersection is displayed to inform the user of the appropriate road and direction at the intersection.

FIGS. 1A-1H show an example of overall procedure and screen display involved in the navigation system. FIG. 1A shows an example of locator map screen of the navigation system when the destination is not specified. Typically, the navigation system displays a street on which the vehicle (current vehicle position VP) is running on a map image and a name of the street. When selecting a "Destination" menu on a main menu screen (not shown), the navigation system displays an "Find Destination By" screen as shown in FIG. 1B for specifying an input method for selecting the destination.

The "Find Destination By" screen of FIG. 1B lists various methods for selecting the destination. The list includes a "Point of Interest (POI)" method for selecting the programmed destination based on the name, category or telephone number. When selecting, for example, the "Point of Interest (POI)" method, the navigation system displays selection methods of point of interest (POI) either by "Place Name" or "Place Type" in FIG. 1C. The "Place Name" is to specify a name of POI, and the "Place Type" is to specify a category or type of POIs. Suppose the "Place Type" is selected, the navigation system shows an "Select Category" screen such as shown in FIG. 1D.

Suppose the user selects "Restaurant", the navigation system retrieves the POIs in the selected category, restaurant, as shown in FIG. 1E. Typically, names of POIs (restaurants) will be listed in the order of distance from the user (ex. current vehicle position). If the user selects a particular restaurant from the list, the navigation system displays a "Confirm Route" screen such as shown in FIG. 1F. In this example, the "Confirm Route" screen lists the name, address and phone number of the destination (POI specified by the user). If this is the correct destination, the user enters an "OK to Proceed" key to proceed to the next procedure.

In FIG. 1G, the navigation system calculates and determines a route to the destination, i.e., the selected POI. The navigation system determines a route to the destination based on predetermined rules such as a shortest way to reach the destination. Then, the navigation system starts the route guidance as shown in FIG. 1H to guide the user along the calculated route to the destination. Typically, the navigation system shows the intersection which is highlighted to show the next turn and a direction of the turn. Such route guidance by the navigation system is also accompanied by voice instructions.

The navigation system continues route guidance to the selected destination until the user reaches the destination or the user manually disables the guidance. The navigation system has a map data which is mainly comprised of nodes and links. The nodes are coordinate points that specify, for example, intersections, ends of roads, turning points, and border points between meshes. The links are connections between the nodes.

FIGS. 2A-2D are schematic diagrams showing the process involved in detecting an arrival at a destination where the destination is a large facility such as a shopping mall or a natural monument such as a lake or park, etc. In FIG. 2A, a vehicle 15 is heading to a POI 20 (destination) by following the route guidance provided by the navigation system. As shown in FIGS. 2A-2D, the actual POI 20 is a relatively large facility or natural monument as it occupies a large area. Based on the map data, a POI is assigned with an address point at one location of the POI. In the case of FIGS. 2A-2D, the navigation system has address data indicating a particular address 21 of the POI 20.

As the vehicle approaches the POI 20, the navigation system starts to operate arrival detection. FIG. 2B shows a schematic diagram showing a conceptual view of how to determine the arrival at the POI 20. As the vehicle 15 approaches the address point 21, the navigation system will start the arrival search by constantly checking if the address point 21 is within a predetermined arrival detection range 18. The arrival detection range 18 is, for example, a circle of 200-300 feet radius.

Thus, the navigation system measures a distance between the vehicle 15 and the address point 21 of the POI 20 to check whether the address point 21 of the POI 20 is within the arrival detection range 18. When the vehicle 15 reaches a point where the address point 21 comes within the arrival detection range 18, such as 200 feet, as shown in FIG. 2C, the navigation system determines the arrival and announces that the user has arrived at the destination. If there is an entrance 24 near the address 21, the user will make a turn and enter the POI 20 through the entrance 24.

In the conventional technology, a problem arises when the destination is a large POI occupying a large area as in FIGS. 2A-2D. Despite its large space, the navigation system recognizes a location of a large POI as a point, namely, a particular address of the POI. Thus, the navigation system will not determine that the vehicle 15 has reached the POI 20 unless the vehicle 15 comes close to the address point 21 so that the point of the address 21 comes within the arrival detection range 18.

There is a case when the user does not want to go that far to the particular address point of the POI 20 to satisfy the objective. For example, in the case where the POI 20 is a stadium, the POI 20 has several entrances 23-25 as shown in FIGS. 2B-2D. Suppose the user has a ticket for the stadium where the seat for the user is located close to the entrance 23 of the POI 20 (stadium). In the conventional technology, the navigation system guides the user to the particular address point 21 of the stadium.

Therefore, in such a situation, it is preferable that the navigation system announces the arrival of the destination earlier so that the user drives the vehicle 15 to the entrance 23 of the stadium as shown in FIG. 2D. However, the navigation system will fail to recognize that the vehicle has arrived in FIG. 2D. This is because the address point 21 has not come within the arrival detection range 18. Thus, despite the actual arrival, the navigation system keeps guiding the user to the address point of the destination. The user will have to cancel the operation to stop the route guidance, which would interfere with safe driving. Accordingly, there is a need of a new method and system to more effectively detect arrival at a destination which is a large scale POI.

SUMMARY OF THE INVENTION

It is, therefore, an object of the present invention to provide a navigation method and system that can accurately determine arrival at a particular destination by using polygonal data representing the destination.

It is a further object of the present invention to provide a navigation method and system that can detect the arrival at a large scale destination as soon as any part of the destination comes within a predetermined arrival detection range.

It is a further object of the present invention to provide a navigation method and system that can detect the arrival to a large scale destination as soon as any part of the destination comes within a predetermined arrival detection range.

One aspect of the present invention is a navigation method for determining an arrival at a particular destination with use of a navigation system. The navigation method comprising the steps of determining if a destination to be reached is associated with polygon data in map data where the polygon data is to express a two-dimensional shape of a place on a map image, performing a route guidance operation to guide a user to the destination through a calculated route, determining if a current position of the user using the navigation system has reached an arrival detection start range of the destination, where the arrival detection start range is a range that substantially encompasses the shape of the destination represented by the polygon data, checking whether any portion of the shape of the destination comes within an arrival detection range when the current user position is within the arrival detection start range, where the arrival detection range is a range defined by a predetermined distance from the current user position, and notifying arrival at the destination when any part of the shape of the destination comes within the arrival detection range.

The navigation method of the present invention further comprises the step of guiding the user to an address point of the destination when no polygon data is associated with the particular destination. The navigation method further comprises the step of creating the arrival detection start range based on size and shape of the destination represented by the polygon data.

In the navigation method, the arrival detection start range is a circle defined by an address point of the destination as its center. The radius of the arrival detection start range corresponds to a distance between the center and a far end of the destination.

Alternatively, the arrival detection start range is a shape symmetrical to and larger than the shape of the destination represented by the polygon data where the arrival detection start range has a predetermined distance from an outer rim of the shape of the destination. In the further modified version, the arrival detection start range is defined by two or more circles each having a center at a corner of the shape of the destination.

Another aspect of the present invention is a navigation apparatus for implementing the various steps of the navigation method noted above. The navigation apparatus is designed to determine arrival at a destination of a large POI, such as a stadium, shopping mall, airport, other large building, lake, park, etc. with use of polygon data in the map data. The navigation apparatus creates an arrival detection start range based on the address point of the destination and the polygon data. When the vehicle approaches the destination and enters the arrival detection start range, the navigation apparatus checks whether any part of the polygon data comes within an arrival detection range. If any part of the polygon data of the destination the comes within the arrival detection range, the navigation apparatus announces that the vehicle has arrived at the destination.

According to the present invention, the navigation system can accurately determine arrival at a particular destination by using polygonal data representing the two-dimensional shape of the destination. The navigation system can effectively detect the arrival at a particular destination in a manner convenient for a user in a practical use when the destination is a large scale place occupying a large area. The navigation system can detect the arrival at a large scale destination as soon as any part of the destination comes within a predetermined arrival detection range.

BRIEF DESCRIPTION OF THE DRAWINGS

FIGS. 1A-1H are schematic diagrams showing an example of operational process and screen display of a navigation system in the conventional technology from selecting a destination, calculating a route to the destination, to a route guidance to the selected destination.

FIGS. 2A-2D are schematic diagrams showing arrival detection to a destination in the conventional technology when the destination is a large scale POI. FIG. 2A shows a situation where a vehicle approaches the destination, FIG. 2B shows a situation where the vehicle further approaches the destination, FIG. 2C shows a situation where the navigation system successfully detects the target address within the arrival detection range, and FIG. 2D shows a situation where the navigation system fails to detect the arrival when the vehicle reached anther entry of the destination.

FIGS. 6A and 6B are schematic diagrams showing a situation where the navigation method and system of the present invention detects an edge of another destination represented by polygonal data within the arrival detection range to determine that the vehicle has arrived at the destination.

FIG. 8 is a schematic diagram showing an example of modified method of the present invention for detecting a point of the destination within the arrival detection range of the navigation system.

FIG. 9 is a schematic diagram showing another example of modified method of the present invention for detecting a point of the destination within the arrival detection range of the navigation system.

DETAILED DESCRIPTION OF THE INVENTION

The present invention will be described in detail with reference to the accompanying drawings. The navigation system of the present invention is designed to determine arrival at a destination of a large POI, such as a stadium, shopping mall, airport, other large building, lake, park, etc. with use of polygon data in the map data. Typically, the map data includes the polygon data which is used for illustrating a map image of a place of a large size. Rather than the node data which shows a location of a node by a point, i.e., latitude and longitude, the polygon data expresses a two-dimensional shape of a particular place. In the case where the map data includes footprint of a building or a other facility, the footprint can also be used in the present invention in the manner same as the polygon data.

When a particular destination is specified by the user, the navigation system calculates a route to the destination based on the address of the specified destination. The navigation system also checks whether the specified destination is associated with polygon data. Typically, as noted above, a large facility or place is expressed by polygon data in the map data so that the two-dimensional shape of the large facility or place can be displayed on the map image of the navigation screen.

Thus, when the specified destination is associated with the polygon data, the navigation system detects the arrival at the destination when any part of the polygon data comes within the arrival detection range of the navigation system. In other words, although the navigation system determines a guidance route to the destination based on the address data of the destination, it does not rely on the address data when the destination is associated with the polygon data. Since the navigation system announces the arrival as soon as any part of the destination is within the arrival detection range, the route guidance operation ends at this timing which is convenient in a practical use.

Figure 3:
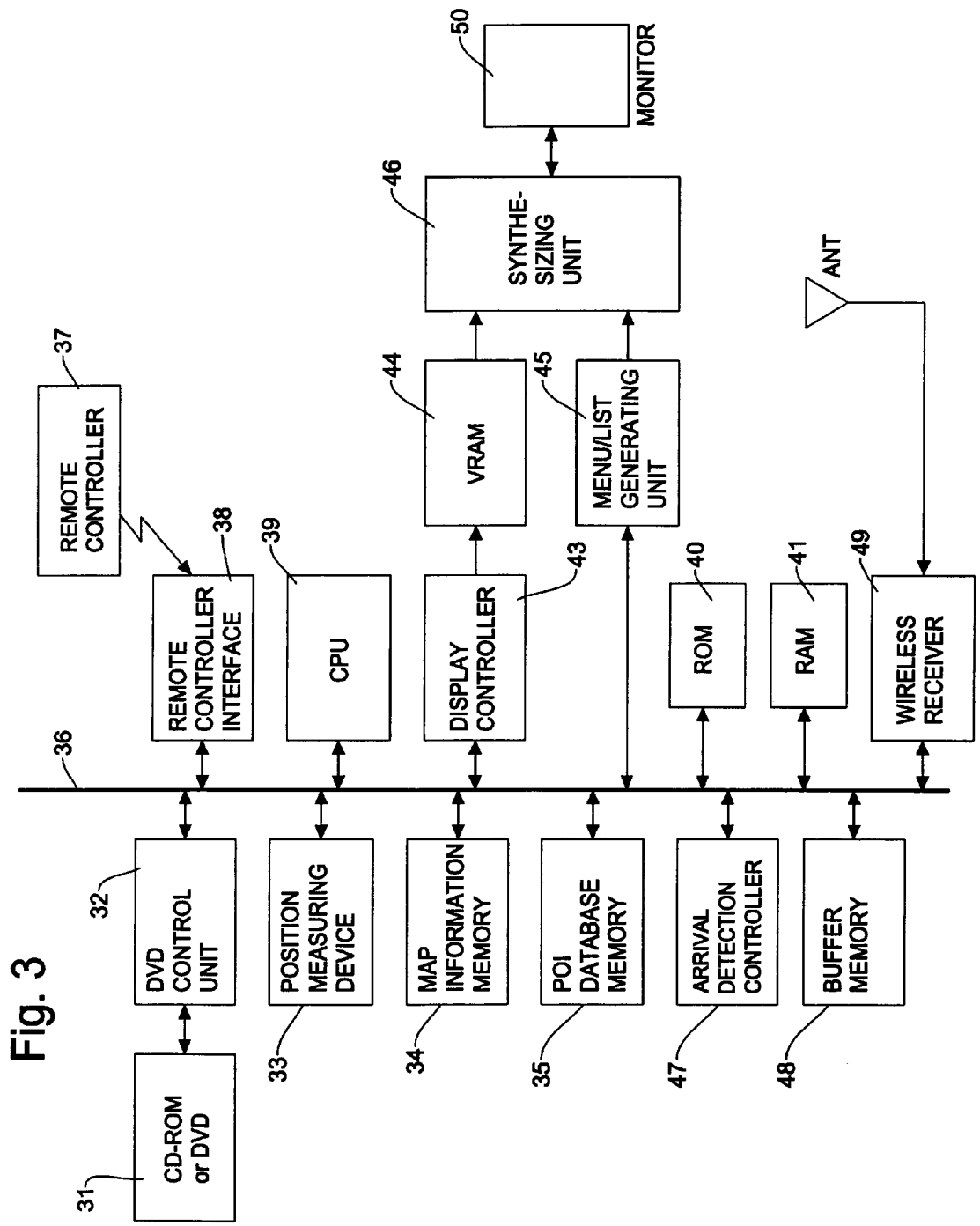
FIG. 3 is a block diagram showing an example of the structure of the navigation system implementing the arrival detection method of the present invention.

FIG. 3 shows an example of structure of a vehicle navigation system implementing the present invention. It should be noted that the present invention can also be applied to portable navigation devices such as a PDA (personal digital assistant) device, a lap-top computer, or other hand-held devices.

In the block diagram of FIG. 3, the navigation system includes a map storage medium 31 such as a CD-ROM, DVD, hard disc or other storage means (hereafter "DVD") for storing map information, a DVD control unit 32 for a controlling an operation for reading the map information from the DVD, a position measuring device 33 for measuring the present vehicle position. The position measuring device 33 has a vehicle speed sensor for detecting a moving distance, a gyroscope for detecting a moving direction, a microprocessor for calculating a position, a GPS receiver, and etc.

The block diagram of FIG. 3 further includes a map information (data) memory 34 for storing the map information which is read out from the DVD 31, a database memory 35 for storing database information such as point of interest (POI) information which is read out from the DVD 31, a remote controller 37 for executing a menu selection operation, an enlarge/reduce operation, a destination input operation, etc., and a remote controller interface 38.

The navigation system further includes a bus 36 for interfacing the above units in the system, a processor (CPU) 39 for controlling an overall operation of the navigation system, a ROM 40 for storing various control programs such as a route search program and a map matching program necessary for navigation control, a RAM 41 for storing a processing result such as a guided (calculated) route, a display controller 43 for generating a map image (a map guide image and an arrow guide image) on the basis of the map information, a VRAM (Video RAM) 44 for storing images generated by the display controller, a menu/list generating unit 45 for generating menu image/various list images, a synthesizing unit 46, an arrival detection controller 47, a buffer memory 48, a wireless receiver 49, and a monitor (display) 50.

The arrival detection controller 47 directly relates to the present invention and has a function of controlling an overall procedure for detecting the arrival at a specified destination and announcing the arrival. The arrival detection controller 47 can be a part of the CPU 39 or a processor separately provided from the CPU 39. Based on the destination specified by the user and the calculated route to the destination, the arrival detection controller 47 checks whether the map data from the map storage medium 31 includes polygon data of the destination.

Typically, the map data includes polygon data for a place occupying a large land to illustrate the map image of such a place. Thus, if a specified destination is a large scale POI, such as a shopping mall, large factory, airport, stadium, lake, park, etc., the map data usually includes corresponding polygon data. The polygon data expresses two-dimensional shape of the selected destination rather than a location of a point of the destination. The arrival detection controller 47 causes to calculate an appropriate route to the specified destination based on the address of the destination.

For the large scale destination, the arrival detection controller 47 creates an arrival detection start range based on the address point of the destination and the polygon data. The arrival detection start range is a predetermined distance range from the address point of the destination to cover substantially all of the two-dimensional shape of the destination. When the vehicle approaches the destination and enters the arrival detection start range, the arrival detection controller 47 checks whether any part of the polygon data comes within an arrival detection range. As noted above, the arrival detection range is a predetermined short distance range from the current vehicle position. If any part of the polygon data of the destination the comes within the arrival detection range, the navigation system announces that the vehicle (user) has arrived at the destination.

Figure 10A:
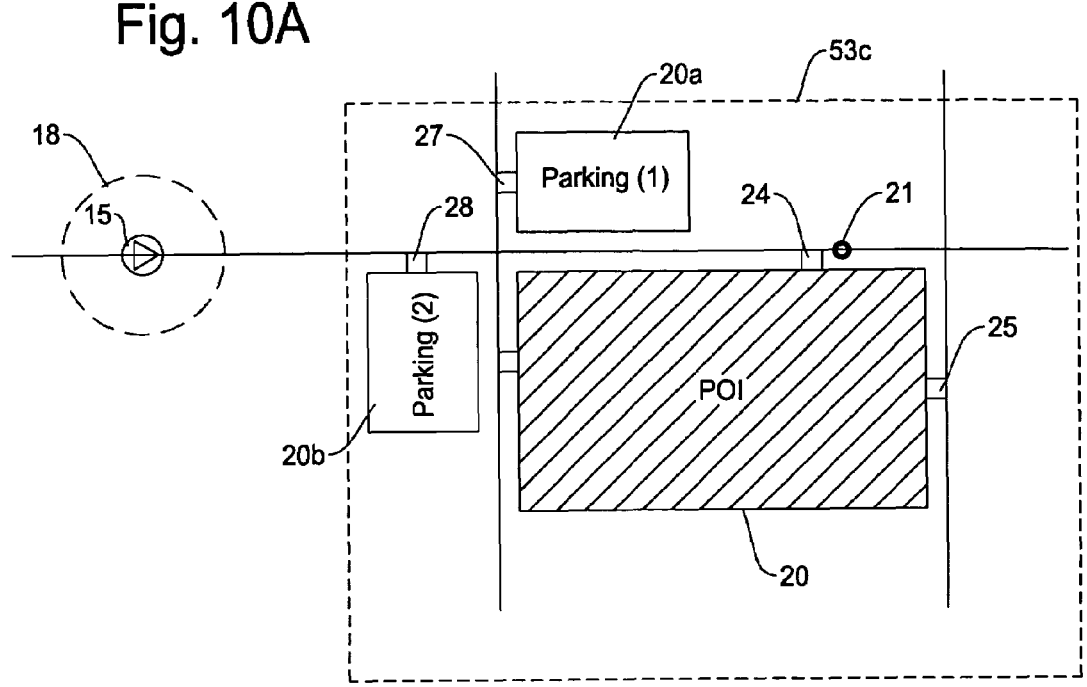
FIGS. 10A and 10B are schematic diagrams showing a further example of modified method of the present invention for detecting a point of the destination within the arrival detection range of the navigation system.
Figure 10B:
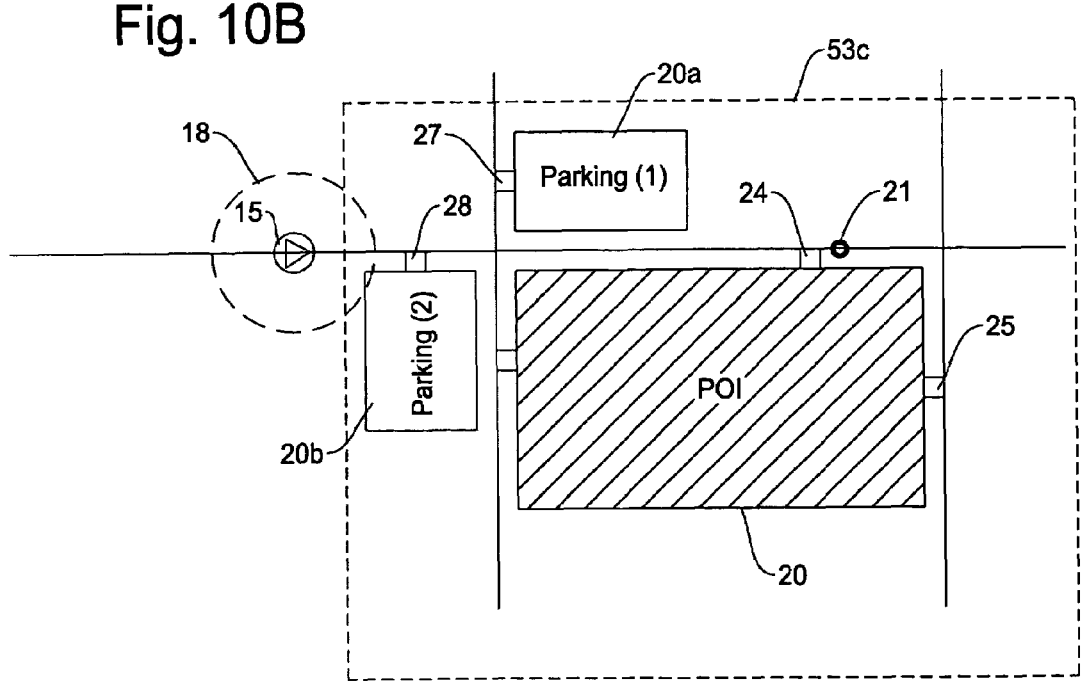

As noted above, the polygon data is provided in the map data for relatively large structures such as shopping malls or stadiums to express the geographical shapes of the structures. Building footprints are also beginning to be provided to the map data for the navigation system as polygon data. Since the polygon data shows a two-dimensional shape and size of the object (destination), it has an advantage that shows a boundary of the object with respect to other places on the map image. It is also possible that one or more pieces of polygon data are associated with a particular destination. For example, a particular large structure such as a shopping mall has two or more parking lots separately from the shopping mall as shown in FIGS. 10A-10B. The present invention can also be advantageously applicable to such a situation as described later.

Figure 4:
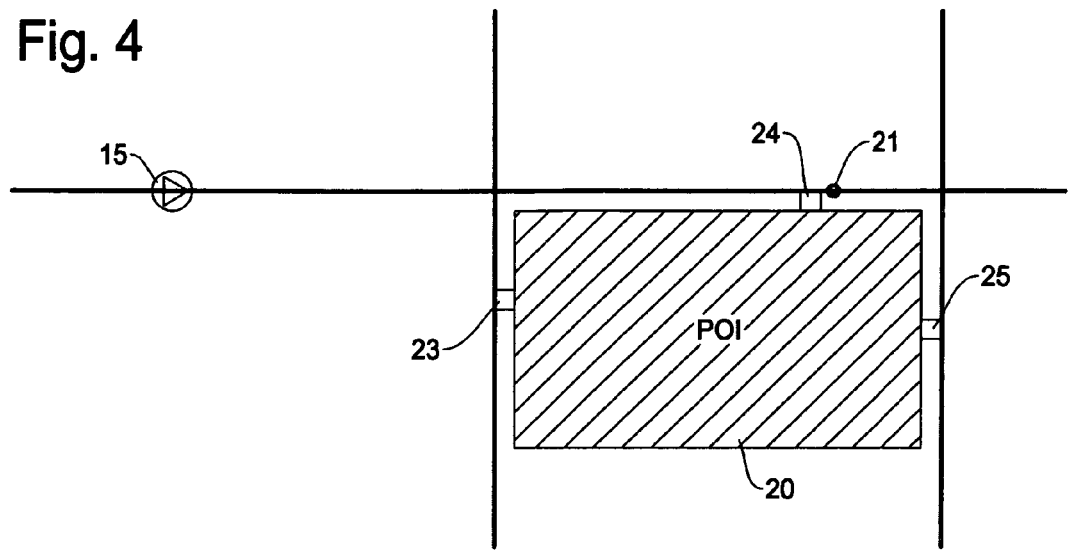
FIG. 4 is a schematic diagram showing the situation where a vehicle approaches a destination which is a large scale POI that is associated with polygonal data in a navigation method and system of the present invention.

Referring to FIG. 4, a POI (point of interest) 20 is a destination specified by the user which is a large scale facility such as a shopping mall. In this example, the POI 20 has a rectangular shape which is defined by polygonal data as shown by the hatched lines. As noted above, the polygon data expresses the size and shape of the POI 20 on the map image in a two-dimensional manner. The map data also includes the address data of the POI 20 which expresses a location of the address point 21 of the POI 20. Since the POI 20 is a large facility, it has a plurality of entrances 23-25 for allowing guests to enter from different locations. Typically, the navigation system calculates a route to the POI 20 based on the initial location of the vehicle and the address point 21. FIG. 4 shows a situation where the vehicle 15 is approaching the destination although it is not close enough to detect the arrival.

Figure 5:
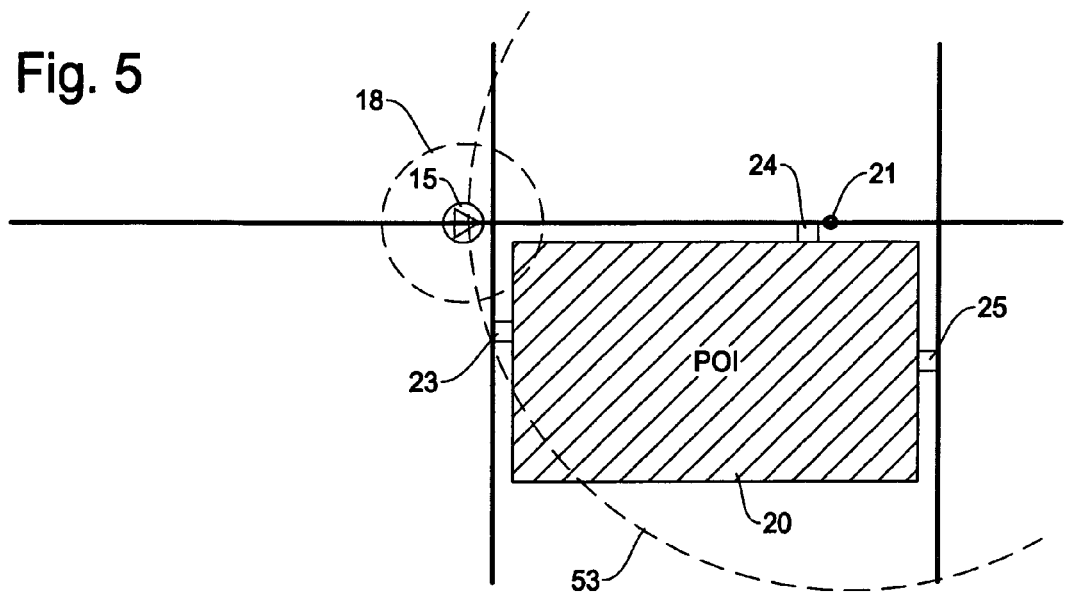
FIG. 5 is a schematic diagram showing a situation where the navigation method and system of the present invention detects an edge of the destination represented by polygonal data within the arrival detection range to determine that the vehicle has arrived at the destination.

FIG. 5 shows a situation where vehicle 15 further advances to the POI 20 and now in the condition that the arrival at the destination can be detected. The navigation method and system of the present invention creates an arrival detection start range 53 as shown in FIG. 5. In this example, the arrival detection start range 53 is a circle defined by a predetermined radius relative to the address point 21 of the POI 20 as a center. The radius of the circle is, for example 0.5 miles, determined by the arrival detection controller 47 (FIG. 3) depending on the size and shape of the destination expressed by the polygon data to substantially cover a far end of the POI 20. In addition to the size and shape of the destination, the radius of the arrival detection start range may also be determined by other factors such as a direction and a route that the vehicle is running toward the destination.

Figure 2A:
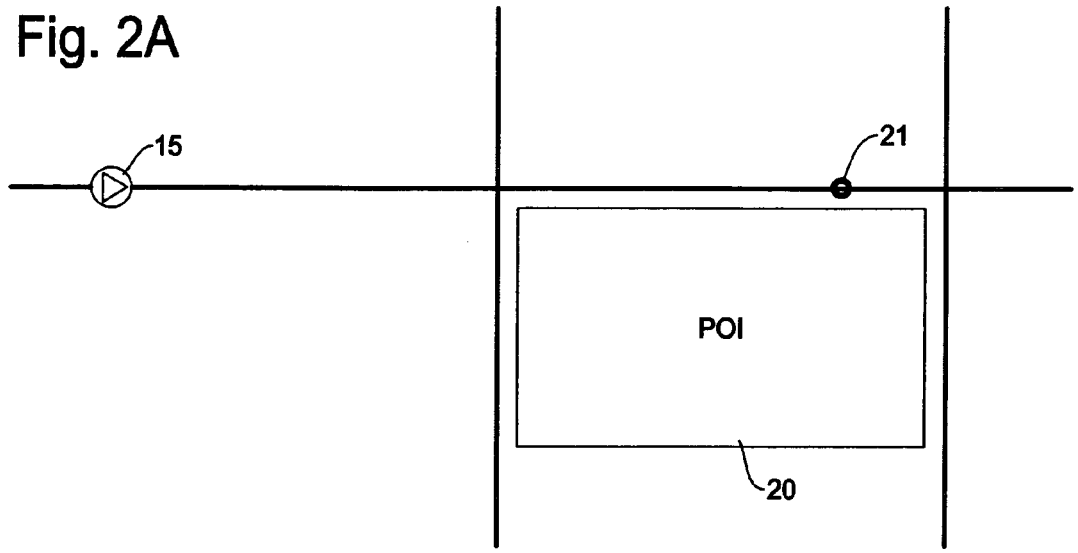
Figure 2B:
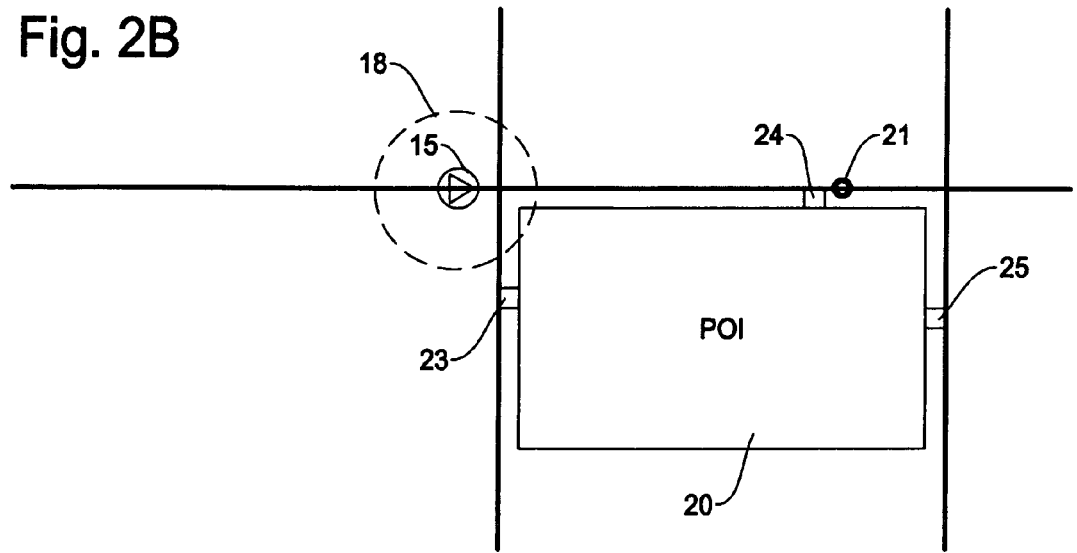

In FIG. 5, since the vehicle approaches the destination and enters the arrival detection start range 53, the navigation system checks whether any part of the polygon data of the POI 20 comes within the arrival detection range 18. The arrival detection range 18 is a predetermined distance range from the current vehicle position such as 200-300 feet. After entering the arrival detection start range 53, if any part of the polygon data of the destination comes within the arrival detection range 18, the navigation system announces that the vehicle (user) has arrived at the destination. It should be noted that the conventional navigation system would not determine that the vehicle 15 has reached POI 20 even when the vehicle 15 came to the entrance 23 (FIG. 2D) because the address point 21 has not come within the arrival determination range 51.

In the example of FIG. 5, because the vehicle 15 is now in the arrival detection start range 53 and a portion (upper left corner) of the POI 20 comes within the arrival detection range 18, the navigation system determines that the vehicle has arrived at the destination (POI 20). Then, the navigation system notifies the arrival by voice announcement or other methods. Thus, the user knows that he has arrived at the destination and selects the entrance of the POI 20 such as the entrance 23 which is convenient for his purpose of visit. In this manner, the navigation system is able to detect the arrival at the destination without requiring to come close to the address point 21 of the POI 20.

FIGS. 6A and 6B show another example where the navigation method and system of the present invention detects an edge of a destination represented by polygonal data. In this example, a POI 80 has an irregular shape unlike the POI 20 in FIGS. 4 and 5. The POI 80 is a destination specified by the user which is a large scale area such as a lake. The topological shape of the POI 80 is expressed by polygon data in the map data as shown by the hatched lines. As noted above, the polygon data expresses the size and shape of the POI 80 on the map image in a two-dimensional manner. The map data also includes the address data of the POI 80 which expresses a location of the address point 81. Since the POI 80 occupies a large area, it has a plurality of entrance routes 83-85 for allowing guests to access lake shore from different locations. Typically, the navigation system calculates a route to the POI based on the initial location of the vehicle and the address point 81.

When the navigation system detects that the particular destination is a place which occupies a large area because this destination involves polygon data, the navigation system creates an arrival detection start range 93. Typically, the arrival detection start range 93 is a circle defined with respect to the address point 81 as its center. The size of the circle of the arrival detection start range 93 will be dependent upon size and shape of the particular polygon data to encompass the far end portions of the POI 80. In FIG. 6A, at a position P1, the navigation system detects that the vehicle is now in the arrival detection start range 93 and starts the arrival detection operation.

As soon as the vehicle 15 comes in the arrival detection start range 93, the navigation system checks whether any part of the POI 80 comes within the arrival detection range 18. Thus, when the vehicle 15 comes to a position P2, the navigation system detects that a part of the polygon of the POI 80 has come within the arrival detection range 18. The navigation system determines that the vehicle has arrived at the destination and ends the route guidance operation. As shown in FIG. 6B, the user may make a right turn to go to the lake shore through the entrance 83 rather than other entrances.

Figure 7:
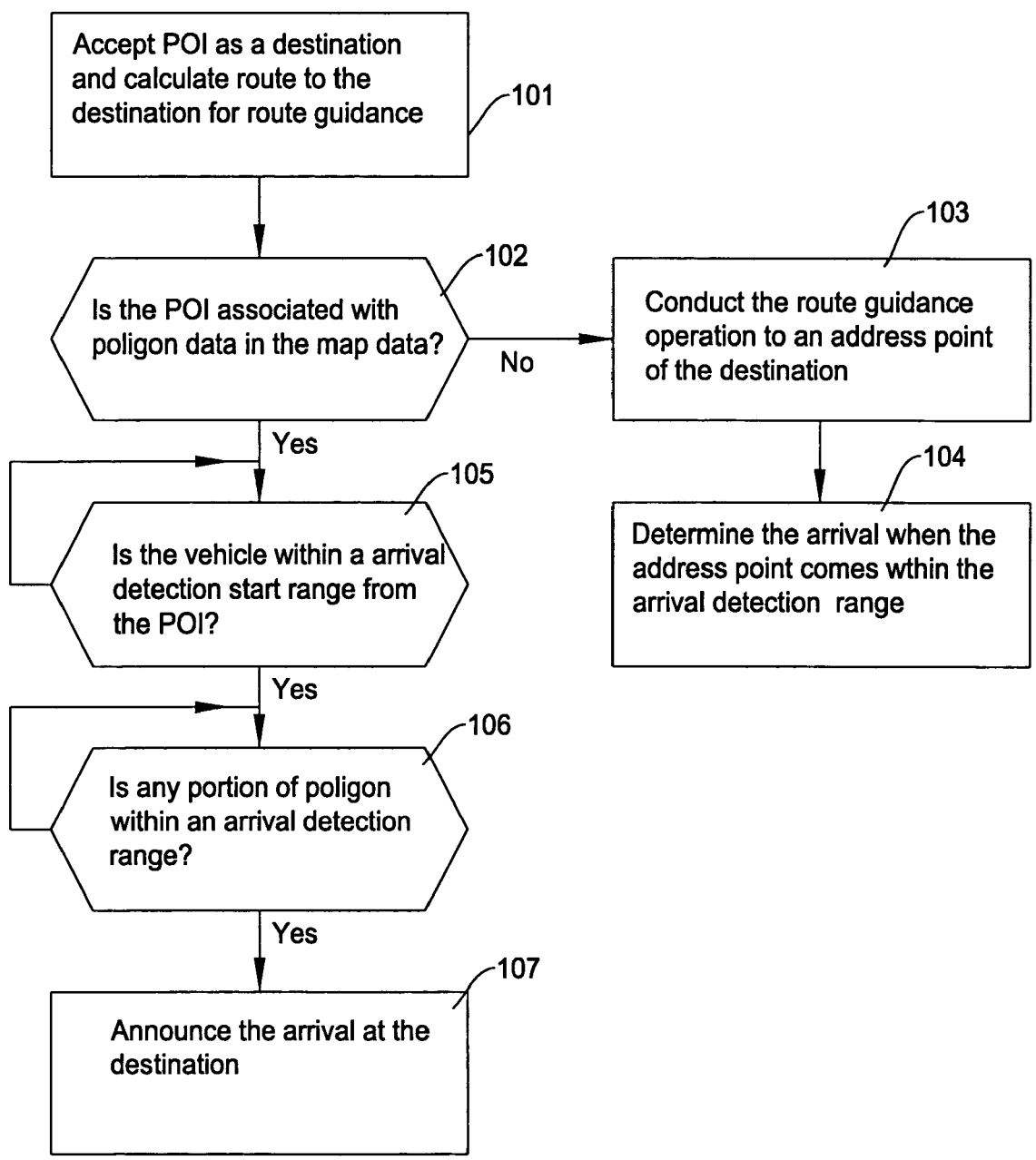
FIG. 7 is a flow chart showing the procedure of detecting an arrival at a destination which is a large scale POI associated with polygonal data in the present invention.

The procedure of the present invention for determining the arrival of a vehicle is described with reference to FIG. 7. The map data in the data storage medium 31 (FIG. 3) for the navigation system includes polygon data showing the two-dimensional shape and size of a large scale POI, such as a shopping mall, large factory, large building, stadium, airport, lake, park, etc. In the present invention, if a particular destination is such a large scale POI which is associated with polygon data, the navigation data will use the polygon data for arrival detection.

In the first step 101, the navigation system accepts a POI as a destination and calculates the route to the destination based on the address data of the destination. At step 102, the navigation system determines whether the particular destination is associated with polygon data by checking the map data. As noted above, if a place occupies a large area, the map data usually includes the polygon data of the place to illustrate the two-dimensional shape of the place on the map image. If the POI specified by the user is not associated with polygon data, the process moves to step 103 where navigation system performs a traditional route guidance operation to guide the user to the address point of the destination. In step 104, the navigation system determines the arrival at the destination when the address point comes within the arrival detection range.

In step 102, if the navigation system determines that the particular destination involves polygon data, the navigation system creates an arrival detection start range as shown in FIGS. 5 and 6A-6B. It should be noted that to use the arrival detection start range is preferable for smooth operation of the arrival detection, however, it is also possible to implement the present invention without using the arrival detection start range noted above. Typically, the arrival detection start range is a circle defined with respect to the address point of the destination as its center. In step 105, the navigation system performs the route guidance operation to the destination while checking whether the vehicle comes within the arrival detection start range.

When the vehicle comes within the arrival detection start range, at step 106, the navigation system checks whether any part of the polygon of the destination comes within the arrival detection range. As noted above, the arrival detection range is typically a circle of a 200-300 feet radius from the vehicle to detect the arrival at the destination. When the navigation system detects that a part of the polygon of the destination comes within the arrival detection range, in step 107, the navigation system announces the arrival at the destination even when the address point of the destination is outside of the arrival detection range, and the process ends.

In determining when to start the arrival detection operation, the navigation system may use an alternative range rather than the one described above. In the above-described embodiment, the navigation system defines the arrival detection start range defined by the position of the POI as shown in FIGS. 5 and 6A-6B. However, it is possible to implement the present invention without using such an arrival detection start range. In such an example of implementation, the navigation system constantly checks whether a part of the polygon of the destination or any facility associated with the destination comes within the arrival detection range and determines the arrival when the polygon comes within the arrival detection range.

In the above-described embodiment, the navigation system defines the arrival detection start range to be a circle centered at the address point of the POI as shown in FIGS. 5 and 6A-6B. However, because the navigation system for detecting the arrival of a POI (destination) utilizes polygon data of the POI, the navigation system may start the arrival detection when the vehicle reaches a certain distance from the outer rim of the polygon. Such an example is shown in FIG. 8 where an arrival detection start range 53a is defined as a shape which is symmetrical to and larger than the outer shape of the polygon of the POI 20. In this example, the arrival detection start range 53a has a rectangular shape whose sides are distanced by a certain length such as 300 feet from the sides of the polygon of the POI 20. Thus, after entering the arrival detection start range 53a, if any part of the polygon data of the destination comes within the arrival detection range 18, the navigation system announces that the vehicle (user) has arrived at the destination.

FIG. 9 shows another example of creating the arrival detection start range that can be implemented in the present invention. In this example, several circles are used to define the arrival detection start ranges which are arranged around the POI 20. Four circles 53b are created to define the arrival detection start range each being centered at the corresponding coordinate (corner) point of the polygon of the POI 20. Thus, after entering the arrival detection start range defined by the circles 53b, if any part of the polygon data of the destination comes within the arrival detection range 18, the navigation system announces that the vehicle (user) has arrived at the destination.

It is also possible that two or more pieces of polygon data are associated with a particular destination. For example, as shown in FIGS. 10A and 10B, a particular large structure 20 such as a shopping mall has one or more parking lots separately from the shopping mall. The present invention can also be advantageously applicable to such a situation. In FIGS. 10A and 10B, in addition to the polygon of the large structure 20, there arises a case where there are one or more polygons are associated with the large structure 20.

For example, a shopping mall (large structure 20) has a parking lot (1) and a parking lot (2) outside of the shopping mall. Suppose the map data includes the polygon data of the parking lots (1) and (2), respectively, the navigation system of the present invention can further advantageously detect the arrival at the destination. For example, the navigation system detects the arrival when the vehicle reaches the closest parking lot rather than the shopping mall 20 itself.

In FIGS. 10A and 10B, the map data includes the polygon data 20a for the parking lot (1) and the polygon data 20b for the parking lot (2). An arrival detection start range 53c is shown in FIGS. 10A and 10B, although the present invention can be implemented without using the arrival detection range 53c. In FIG. 10B, when the navigation system detects that the polygon 20 of the parking lot (2) comes within the arrival detection range 18, the navigation system announces the arrival at the destination (shopping mall 20). Thus, the user can go in the parking lot (2) of the destination which is closest to the user.

According to the present invention, the navigation system can accurately determine arrival at a particular destination by using polygonal data representing the two-dimensional shape of the destination. The navigation system can effectively detect the arrival at a particular destination in a manner convenient for a user in a practical use when the destination is a large scale place occupying a large area. The navigation system can detect the arrival at a large scale destination as soon as any part of the destination comes within a predetermined arrival detection range.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method of determining an arrival at a particular destination for use with a navigation system, comprising the following steps of:

determining if a destination to be reached is associated with polygon data in map data where the polygon data shows a shape of the destination or other place related to the destination;

performing a route guidance operation to guide a user to the destination through a calculated route;

checking whether a current user position has reached an arrival detection start range where the arrival detection start range is a range that encompasses a whole shape of the destination or a range that derives from a particular shape of the destination where the destination includes a place related to the destination which is represented by the polygon data;

checking whether any portion of the shape of the destination defined by polygon data comes within an arrival detection range where the arrival detection range is a range defined by a predetermined distance from the current user position; and notifying arrival at the destination when the current user position comes within the arrival detection start range and also when any part of the shape of the destination comes within the arrival detection range.

2. A method of determining an arrival as defined in claim 1, said step of checking whether any portion of the shape of the destination or the place related to the destination comes within the arrival detection range starts when the current user position comes within the arrival detection start range.

3. A method of determining an arrival as defined in claim 1, further comprising the step of guiding the user to an address point of the destination when no polygon data is associated with the particular destination.

4. A method of determining an arrival as defined in claim 1, further comprising the step of creating the arrival detection start range based on size and shape of the destination represented by the polygon data.

5. A method of determining an arrival as defined in claim 1, wherein the arrival detection start range is a circle defined by an address point of the destination as its center.

6. A method of determining an arrival as defined in claim 1, wherein the arrival detection start range is a circle defined by an address point of the destination as its center and a radius corresponding to a distance between the center and a far end of the shape of the destination defined by the polygon data.

7. A method of determining an arrival as defined in claim 1, wherein the arrival detection start range is a shape symmetrical to and larger than the shape of the destination represented by the polygon data where the arrival detection start range has a predetermined distance from an outer rim of the shape of the destination.

8. A method of determining an arrival as defined in claim 1, wherein the arrival detection start range is defined by two or more circles each having a center at a corner of the shape of the destination.

9. A method of determining an arrival as defined in claim 1, wherein the destination is a large scale place including a shopping mall, a stadium, a large building, airport, lake, and park.

10. An apparatus for of determining an arrival at a particular destination for use with a navigation system, comprising:
    means for determining if a destination to be reached is associated with polygon data in map data where the polygon data shows a shape of the destination or other place related to the destination;
    means for performing a route guidance operation to guide a user to the destination through a calculated route;
    means for checking whether a current user position has reached an arrival detection start range where the arrival detection start range is a range that encompasses a whole shape of the destination or a range that derives from a particular shape of the destination where the destination includes a place related to the destination which is represented by the polygon data;
    means for checking whether any portion of the shape of the destination defined by polygon data comes within an arrival detection range where the arrival detection range is a range defined by a predetermined distance from a current user position; and
    means for notifying arrival at the destination when the current user position comes within the arrival detection start range and also when any part of the shape of the destination comes within the arrival detection range.

11. An apparatus for determining an arrival as defined in claim 10, said means for checking whether any portion of the shape of the destination or the place related to the destination comes within the arrival detection range starts when the current user position comes within the arrival detection start range.

12. An apparatus for determining an arrival as defined in claim 10, further comprising means for guiding the user to an address point of the destination when no polygon data is associated with the particular destination.

13. An apparatus for determining an arrival as defined in claim 10, further comprising means for creating the arrival detection start range based on size and shape of the destination represented by the polygon data.

14. An apparatus for determining an arrival as defined in claim 10, wherein the arrival detection start range is a circle defined by an address point of the destination as its center.

15. An apparatus for determining an arrival as defined in claim 10, wherein the arrival detection start range is a circle defined by an address point of the destination as its center and a radius corresponding to a distance between the center and a far end of the shape of the destination defined by the polygon data.

16. An apparatus for determining an arrival as defined in claim 10, wherein the arrival detection start range is a shape symmetrical to and larger than the shape of the destination represented by the polygon data where the arrival detection start range has a predetermined distance from an outer rim of the shape of the destination.

17. An apparatus for determining an arrival as defined in claim 10, wherein the arrival detection start range is defined by two or more circles each having a center at a corner of the shape of the destination.

18. An apparatus for determining an arrival as defined in claim 10, wherein the destination is a large scale place including a shopping mall, a stadium, a large building, airport, lake, and park.

* * * * *